United States Patent [19]
Takahashi et al.

[11] Patent Number: 4,610,912
[45] Date of Patent: Sep. 9, 1986

[54] MAGNETO-OPTIC MEMORY ELEMENT

[75] Inventors: Akira Takahashi, Nara; Yoshiteru Murakami; Junji Hirokane, both of Tenri; Hiroyuki Katayama, Nara; Kenji Ohta, Yao; Hideyoshi Yamaoka, Matsubara, all of Japan

[73] Assignee: Sharp Kabushiki Kaisha, Osaka, Japan

[21] Appl. No.: 648,741

[22] Filed: Sep. 10, 1984

[30] Foreign Application Priority Data

Sep. 16, 1983 [JP] Japan ................... 58-171488
Jul. 3, 1984 [JP] Japan ................... 59-139434
Jul. 13, 1984 [JP] Japan ................... 59-146234

[51] Int. Cl.$^4$ ............................... G11B 7/24
[52] U.S. Cl. ........................ 428/213; 428/216; 428/469; 428/472; 428/694; 428/698; 428/900
[58] Field of Search ............ 350/375; 360/114; 365/122; 369/110; 370/2; 428/469, 472, 692, 693, 697, 698, 695, 213, 216, 694

[56] References Cited

U.S. PATENT DOCUMENTS

| | | |
|---|---|---|
| 3,514,766 | 5/1970 | Mee et al. . |
| 3,973,072 | 8/1976 | Anderson ................... 428/900 |
| 4,042,341 | 8/1977 | Smeggil ..................... 428/220 |
| 4,091,171 | 5/1978 | Ohta et al. .................. 428/539 |
| 4,126,494 | 11/1978 | Imamura et al. . |
| 4,202,022 | 5/1980 | Imamura et al. . |
| 4,245,008 | 1/1981 | Michaelsen et al. ............... 428/611 |
| 4,293,621 | 10/1981 | Togami ........................ 428/900 |
| 4,310,899 | 1/1982 | Biesterbos et al. . |
| 4,347,112 | 8/1982 | Togami ........................ 204/192 M |
| 4,390,600 | 6/1983 | Ohta et al. ................... 428/621 |
| 4,412,264 | 10/1983 | Imamura et al. ................ 36/131 |
| 4,414,650 | 11/1983 | Ohta et al. ................... 365/122 |
| 4,450,201 | 5/1984 | Brill et al. ................... 428/336 |
| 4,467,383 | 8/1984 | Ohta et al. . |
| 4,489,139 | 12/1984 | Ohta et al. ................... 428/621 |

OTHER PUBLICATIONS

Egashira et al., *Journal of Applied Physics*, vol. 48, No. 8, Aug. 1974, p. 3643.

Primary Examiner—George F. Lesmes
Assistant Examiner—William M. Atkinson
Attorney, Agent, or Firm—Birch, Stewart, Kolasch & Birch

[57] ABSTRACT

A magneto-optic memory element includes a transparent substrate, a first transparent nitride film, a GdTbFe recording layer, a second transparent nitride film, and a reflection film formed in this order. The first transparent nitride film has an index of refraction higher than that of the second transparent nitride film. In a preferred form, the first transparent nitride film is a SiN film having the index of refraction of about 2.0, and the second transparent nitride film is an AlN film having the index of refraction of about 1.8 to 1.9.

15 Claims, 4 Drawing Figures

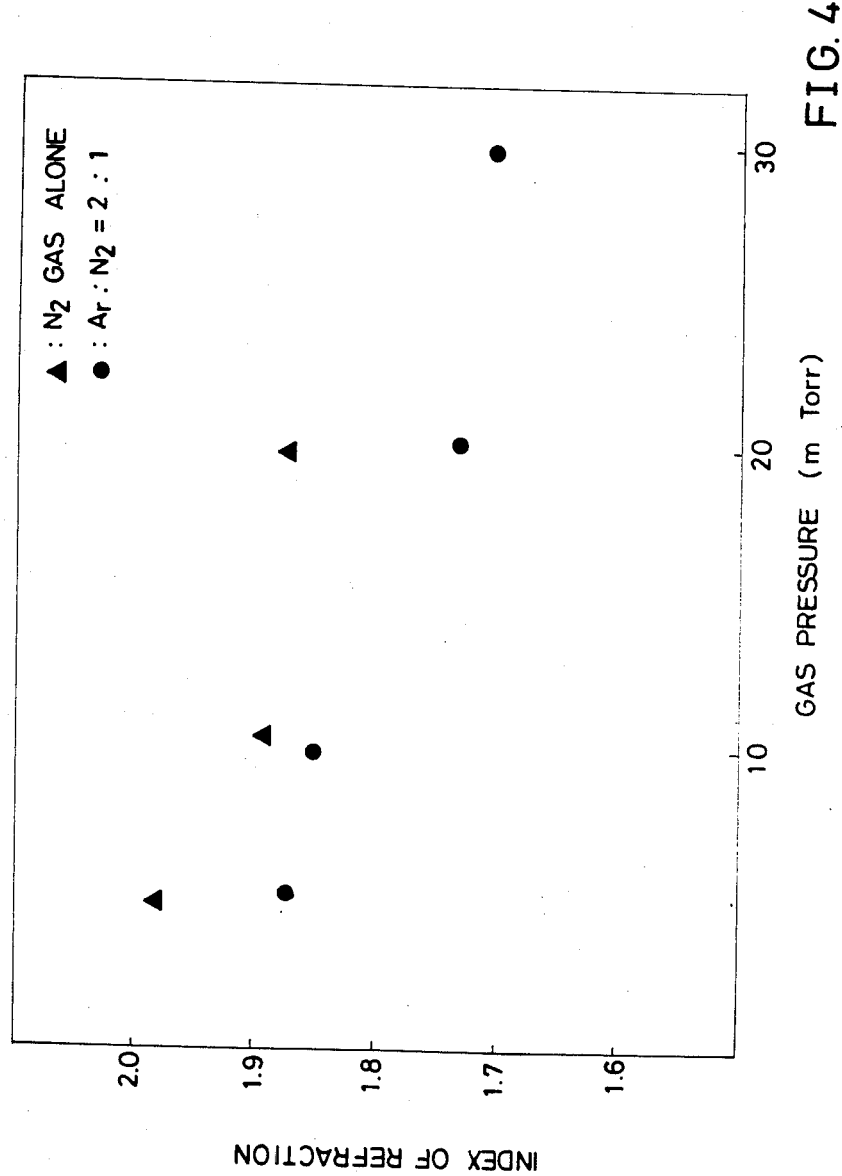

MAGNETO-OPTIC MEMORY ELEMENT

BACKGROUND OF THE INVENTION

1. Field of the Invention

The present invention relates to a magneto-optic memory element to which a laser beam is impinged to record, read out or erase the information onto or from the magneto-optic memory element.

2. Description of the Prior Art

Recently, a magneto-optic memory element has been developed, which is used in an optical memory disc storing alterable information. The most effective magneto-optic memory element includes a recording medium made of an amorphous alloy thin-film consisting of a rare earth metal and a transition metal. Such a magneto-optic memory element is stable because the recording bit is not affected by the grain boundary, and a large size recording medium can be easily formed.

However, the conventional magneto-optic memory element including the amorphous alloy thin-film recording layer consisting of a rare earth metal and a transition metal does not demonstrate a satisfactory S/N ratio of the reproduced signal because sufficient photoelectro-magnetic effects (Kerr effect and Faraday effect) are not obtained.

To enhance the photoelectro-magnetic effect, the engineering group including the present inventors has developed a magneto-optic memory element which includes an amorphous alloy thin-film recording layer consisting of rare earth metal and transition metal sandwiched by a pair of transparent dielectric layers. The dielectric layer is generally made of SiO or $SiO_2$. The pair of transparent dielectric layers function to effectively combine the Kerr effect and the Faraday effect so as to increase the Kerr rotation angle. However, in the above-mentioned element, there is a possibility that the amorphous alloy thin-film recording layer is damaged due to the oxidation caused by the SiO or $SiO_2$ dielectric layer.

A typical element of the above construction is disclosed in copending U.S. patent application, "MAGNETO-OPTIC MEMORY DEVICE", Ser. No. 697,027 which is a continuation of Ser. No. 489,889, filed on Apr. 19, 1983 by Kenji OHTA, Akira TAKAHANSHI, Hiroyuki KATAYAMA, Junji HIROKANE and Hideyoshi YAMAOKA, and assigned to the same assignee as the present application. The corresponding European Patent Application was filed on Apr. 28, 1983 and assigned Application No. 83302419.3. The corresponding Canadian Patent Application is Ser. No. 427,088 filed on Apr. 29, 1983.

OBJECTS AND SUMMARY OF THE INVENTION

1. Objects of the Invention

Accordingly, an object of the present invention is to provide a magneto-optic memory element including an amorphous alloy thin-film recording layer consisting of a rare earth element and a transition metal.

Another object of the present invention is to stabilize an amorphous alloy thin-film recording layer included in a magneto-optic memory element.

Still another object of the present invention is to enhance the photoelectro-magnetic effect in a magneto-optic memory element including an amorphous alloy thin-film recording layer consisting of a rare earth element and a transition metal.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

2. Summary of the Invention

To achieve the above objects, pursuant to an embodiment of the present invention, a magneto-optic memory element includes an amorphous alloy thin-film recording layer consisting of a rare earth element and a transition metal sandwiched between a pair of transparent nitride films. In a preferred form, a first transparent nitride film is formed on a transparent substrate, the amorphous recording layer is formed on the first transparent nitride film, a second transparent nitride film is formed on the amorphous recording layer, and a reflection film is formed on the second transparent nitride film. The first and second transparent nitride films are selected so that the first transparent nitride film has the index of refraction greater than that of the second transparent nitride film. The first transparent nitride film is preferably a SiN film of 90 nm thick, having the index of refraction of about 2.0. The second transparent nitride film is preferably an AlN film of 40 nm thick, having the index of refraction of about 1.8 to 1.9.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 4 is a graph showing the index of refraction of a transparent dielectric layer included in still another embodiment of a magneto-optic memory element of the present invention.

DESCRIPTION OF THE PREFERRED EMBODIMENTS

Figure 1:
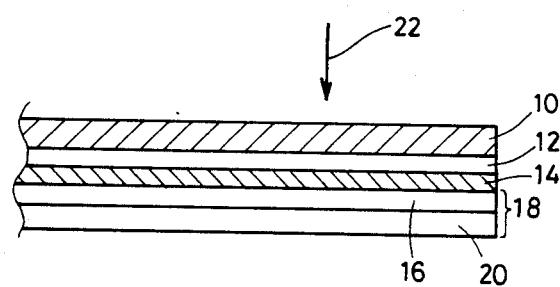
FIG. 1 is a sectional view of an essential part of a magneto-optic memory element on which the present invention is based.

FIG. 1 shows a magneto-optic memory element developed by an engineering group including the present inventors. The magneto-optic memory element of FIG. 1 provides a basic construction on which the present invention is based.

The magneto-optic memory element of FIG. 1 includes a transparent substrate 10 made of, for example, glass, polycarbonate or acrylic resin. A first transparent dielectric layer 12 is formed on the transparent substrate 10. The first transparent dielectric layer 12 is a SiO film having a 120 nm thickness. An alloy thin-film recording layer 14 including a rare earth element and a transition metal is formed on the first transparent dielectric layer 12. The alloy thin-film recording layer 14 is a GdTbFe alloy thin-film of 15 nm thick. A second transparent dielectric layer 16 is formed on the alloy thin-film recording layer 14. The second transparent dielectric layer 16 is a $SiO_2$ film of 50 nm. A reflection film layer 20 made of a Cu film of 50 nm thick is formed on the second transparent dielectric layer 16. The thus formed magneto-optic memory element shows a large apparent Kerr rotation angle of 1.75°.

The following is an explanation why a large Kerr rotation angle is obtained in the magneto-optic memory element of FIG. 1.

When a laser beam 22 is applied to the alloy thin-film recording layer 14 through the transparent substrate 10, the introduced laser beam repeatedly reflects in the first transparent dielectric layer 12. The interference of the reflected beams functions to increase the apparent Kerr rotation angle. The Kerr rotation angle becomes large as the index of refraction of the first transparent dielectric layer 12 becomes large.

The apparent Kerr rotation angle is further increased by disposing the reflection film layer 20 at the back of the alloy thin-film recording layer 14. The apparent Kerr rotation angle is effectively increased because the second transparent dielectric layer 16 is disposed between the alloy thin-film recording layer 14 and the reflection film layer 20. The function of the second transparent dielectric layer 16 and the reflection film layer 20 will be described hereinbelow in the qualitative manner.

Now assume that the second transparent dielectric layer 16 and the reflection film layer 20 function, in combination, as a reflection layer 18. A first beam introduced through the transparent substrate 10, passed through the alloy thin-film recording layer 14, reflected from the reflection layer 18, and again passed through the alloy thin-film recording layer 14, and a second beam introduced through the transparent substrate 10 and reflected from the surface of the alloy thin-film recording layer 14 are combined with each other. That is, the Kerr effect is produced when the beam is reflected from the surface of the alloy thin-film recording layer 18. Further, the Faraday effect is produced when the beam travels through the alloy thin-film recording layer 14. The Kerr effect and the Faraday effect are combined with each other to increase the apparent Kerr rotation angle. Accordingly, in the magneto-optic memory element of the above construction, it is important to effectively add the Faraday effect to the Kerr effect. The rotation angle derived from the Faraday effect becomes large as the recording layer is thicker. However, the thicker recording layer absorbs the laser beam and, therefore, a preferable result is not obtained. The thickness of the recording layer is determined with reference to the wavelength of the laser beam and the index of refraction of the reflection layer. Generally, the recording layer is constructed to have a thickness of about 10 through 50 nm. It will be clear that the reflection layer should have a high index of reflection. That is, the index of refraction of the reflection layer (including the second transparent dielectric layer 16 and the reflection film layer 20) should be as close as zero (0). More specifically, the real part of the second transparent dielectric layer must be small, the imaginary part thereof must be zero (b 0), and the real part of the reflection film layer must be small.

As discussed above, the Kerr rotation angle is increased when the first transparent dielectric layer 12 is disposed between the transparent substrate 10 and the alloy thin-film recording layer 14, and the reflection layer 18 is disposed at the back of the alloy thin-film recording layer 14. When the SiO film is used as the first transparent dielectric layer 12, and the $SiO_2$ film is used as the second transparent dielectric layer 16, there is a possibility that the alloy thin-film recording layer 14 is oxidized by the oxygen derived from the SiO layer and the $SiO_2$ layer. That is, the oxygen included in the SiO layer and the $SiO_2$ layer is separated when the SiO layer and the $SiO_2$ layer are formed, or after the formation of the SiO layer and the $SiO_2$ layer. The alloy thin-film recording layer 14 is damaged when it is oxidized. The oxidation greatly affects the characteristics of the alloy thin-film recording layer 14 when the alloy thin-film recording layer 14 is thin.

Figure 2:
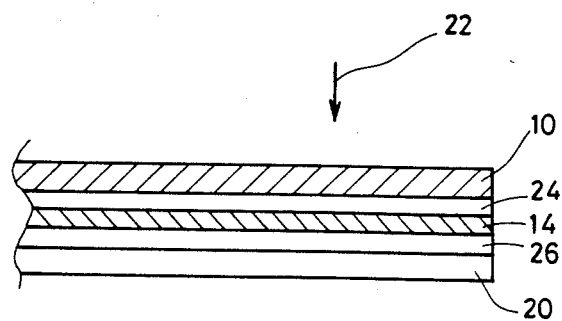
FIG. 2 is a sectional view of an essential part of an embodiment of a magneto-optic memory element of the present invention.

FIG. 2 shows an embodiment of a magneto-optic memory element of the present invention. Like elements corresponding to those of FIG. 1 are indicated by like numerals.

A first transparent nitride dielectric layer 24 of 90 nm thick is formed on the transparent substrate 10 made of, for example, glass, polycarbonate or acrylic resin. The alloy thin-film recording layer 14 is formed on the first transparent nitride dielectric layer 24. In this example, the alloy thin-film recording layer 14 is a GdTbFe film of 35 nm thick. A second transparent nitride dielectric layer 26 of 40 nm thick is formed on the alloy thin-film recording layer 14. Further, the reflection film layer 16 is formed on the second transparent nitride dielectric layer 26. In this example, the reflection film layer 20 is an Al film having a thickness greater than 40 nm.

[EXAMPLE I]

Each layer is made of as follows:
transparent substrate 10: glass substrate
first transparent nitride dielectric layer 24: SiN film of 90 nm thick
alloy thin-film recording layer 14: GdTbFe alloy thin-film of 35 nm thick
second transparent nitride dielectric layer 26: AlN film of 40 nm thick
reflection film layer 20: Al film having a thickness of above 40 nm The first transparent nitride dielectric layer 24 is the SiN layer, and the second transparent nitride dielectric layer 26 is the AlN layer. Both the SiN and AlN layers have the high melting point and, therefore, the layers 24 and 26 are stable. The nitride layer is finer than the oxide layer. SiN has an index of refraction of about 2.0. AlN has an index of refraction of about 1.8 to 1.9. That is, the index of refraction of the first transparent nitride dielectric layer 24 is greater than that of the second transparent nitride dielectric layer 26. As already discussed, the high index of refraction of the first transparent nitride dielectric layer 24 ensures a large Kerr rotation angle, and the low index of refraction of the second transparent nitride dielectric layer 26 ensures a high reflection. The thickness of the SiN film layer can be 90 nm±10%, and the thickness of the AlN film layer can be 40 nm±10%. Since the SiN film and the AlN film do not include the oxygen, the oxidation of the alloy thin-film recording layer 14 is minimized.

[EXAMPLE II]

Each layer is made of as follows:
transparent substrate 10: glass substrate first transparent nitride dielectric layer 24: AlN film of 90 nm thick alloy thin-film recording layer 14: GdTbFe alloy thin-film of 35 nm thick second transparent nitride dielectric layer 26: AlN film of 40 nm thick reflection film layer 20: Al film having a thickness of above 40 nm The AlN film of the first transparent nitride dielectric layer 24 has the index of refraction higher than that of the AlN film of the second transparent nitride dielectric layer 26. AlN has the high melting point and, therefore, the layers 24 and 26 are stable. In a preferred form, the AlN film of the first transparent nitride dielectric layer 24 is constructed to have the index of refraction of about 2.0, and the AlN film of the second transparent nitride dielectric layer 26 is constructed to have the index of refraction of about 1.8 to 1.9. The thickness of the AlN film of the first transparent nitride dielectric layer 24 can be 90 nm±10%, and the thickness of the AlN film of the second transparent nitride dielectric layer 26 can be 40 nm±10%. The different index of refraction of the AlN film is formed in the following manner.

Figure 3:
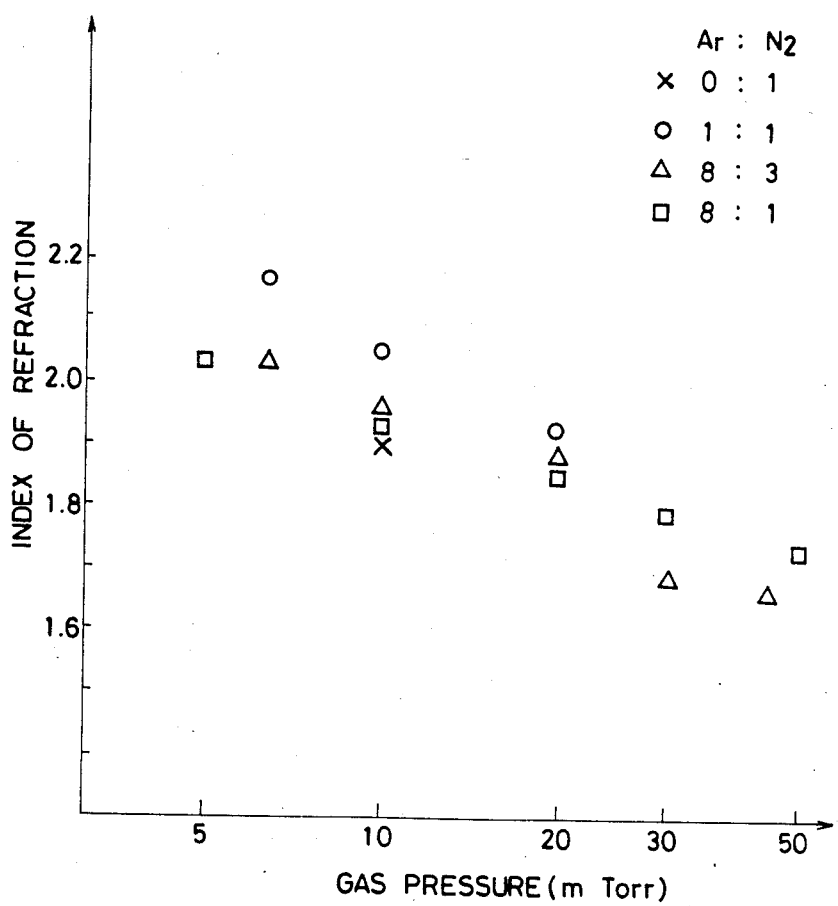
FIG. 3 is a graph showing the index of refraction of a transparent dielectric layer included in another embodiment of a magneto-optic memory element of the present invention.

The AlN film is formed through the use of a reactive sputtering method wherein high purity aluminum is used as the target in a mixed gas including Ar and $N_2$. FIG. 3 shows the index of refraction of the AlN film formed in various sputtering conditions. The index of refraction is not greatly influenced by the ratio between Ar and $N_2$, but is highly dependent on the gas pressure. The index of the refraction is high when the AlN film is formed in a low gas pressure condition. The index of refraction is low when the AlN film is formed in a high gas pressure condition.

[EXAMPLE III]

Each layer is made of as follows:

transparent substrate 10: glass substrate first transparent nitride dielectric layer 24: $Si_3N_4$ film of 90 nm thick alloy thin-film recording layer 14: GdTbFe alloy thin-film of 35 nm thick second transparent nitride dielectric layer 26: $Si_3N_4$ film of 40 nm thick reflection film layer 20: Al film having a thickness of above 40 nm The $Si_3N_4$ film of the first transparent nitride dielectric layer 24 has the index of refraction higher than that of the $Si_3N_4$ film of the second transparent nitride dielectric layer 26. $Si_3N_4$ has the high melting point and, therefore, the layers 24 and 26 are stable. In a preferred form, the $Si_3N_4$ film of the first transparent nitride dielectric layer 24 is constructed to have the index of refraction of about 2.0, and the $Si_3N_4$ film of the second transparent nitride dielectric layer 26 is constructed to have the index of refraction of about 1.8 to 1.9. The thickness of the $Si_3N_4$ film of the first transparent nitride dielectric layer 24 can be 90 nm±10%, and the thickness of the $Si_3N_4$ film of the second transparent nitride dielectric layer 26 can be 40 nm±10%. The $Si_3N_4$ film of the different index of refraction is formed in the following manner.

The $Si_3N_4$ film is formed through the use of a reactive sputtering method wherein high purity silicon is used as the target in a $N_2$ gas or in a mixed gas including Ar and $N_2$. FIG. 4 shows the index of refraction of the $Si_3N_4$ film formed in various sputtering conditions. The index of refraction depends on the gas pressure and the ratio between Ar and $N_2$. The index of refraction is high when the $Si_3N_4$ film is formed in a low gas pressure condition. The index of refraction is low when the $Si_3N_4$ film is formed in a high gas pressure condition.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A magneto-optic memory element comprising:
   a transparent substrate;
   a first transparent nitride dielectric layer formed on said transparent substrate, said first transparent nitride dielectric layer having a first index of refraction;
   an alloy thin-film recording layer including rare earth element and transition metal formed on said first transparent nitride dielectric layer;
   a second transparent nitride dielectric layer formed on said alloy thin-film recording layer, said second transparent nitride dielectric layer having a second index of refraction which is smaller than said first index of refraction; and
   a reflection layer formed on said second transparent nitride dielectric layer.

2. The magneto-optic memory element of claim 1, wherein said first index of refraction is about 2.0, and said second index of refraction is about 1.8 to 1.9.

3. The magneto-optic memory element of claim 2, wherein said alloy thin-film recording layer is a GdTbFe alloy thin-film of 35 nm thick.

4. The magneto-optic memory element of claim 2, wherein said first transparent nitride dielectric layer is a SiN film of about 90 nm thick, and said second transparent nitride dielectric layer is an AlN film of about 40 nm thick.

5. The magneto-optic memory element of claim 1, wherein said first and second transparent nitride dielectric layers are formed by a reactive sputtering method, and wherein the sputtering condition is controlled so as to differ the index of refraction between said first and second transparent nitride dielectric layers.

6. The magneto-optic memory element of claim 5, wherein a gas pressure at which said first transparent nitride dielectric layer is formed is lower than a gas pressure at which said second transparent nitride dielectric layer is formed.

7. The magneto-optic memory element of claim 5, wherein said first transparent nitride dielectric layer is an AlN film of about 90 nm thick having said first index of refraction of about 2.0, and said second transparent nitride dielectric layer is an AlN film of about 40 nm thick having said second index of refraction of about 1.8 to 1.9.

8. The magneto-optic memory element of claim 7, wherein said alloy thin-film recording layer is a GdTbFe alloy thin-film layer.

9. The magneto-optic memory element of claim 5, wherein said first transparent nitride dielectric layer is a $Si_3N_4$ of about 90 nm thick having said first index of refraction of about 2.0, and said second transparent nitride dielectric layer is a $Si_3N_4$ film of about 40 nm thick having said second index of refraction of about 1.8 to 1.9.

10. The magneto-optic memory element of claim 9, wherein said alloy thin-film recording layer is a GdTbFe alloy thin-film layer.

11. A magneto-optic memory element comprising:
a transparent substrate;
a first nitride transparent dielectric layer formed on said transparent substrate, said first transparent dielectric layer having a first index of refraction;
an alloy thin-film recording layer formed on said first transparent dielectric layer; and
a second nitride transparent dielectric layer formed on said alloy thin-film recording layer, said second transparent dielectric layer having a second index of refraction which is smaller than said first index of refraction.

12. The magneto-optic memory element of claim 11, wherein said first index of refraction is about 2.0, and said second index of refraction is about 1.8 to 1.9.

13. The magneto-optic memory element of claim 11 further comprising a reflection layer formed on said second transparent dielectric layer.

14. The magneto-optic memory element of claim 11 wherein said alloy thin-film recording layer is formed of a rare earth element and a transition metal.

15. The magneto-optic memory element of claim 14 wherein said alloy thin-film recording layer is a GdTbFe alloy thin-film.

* * * * *